US012724222B2

(12) United States Patent
Kobayashi et al.

(10) Patent No.: US 12,724,222 B2
(45) Date of Patent: Sep. 1, 2026

(54) CAMERA MODULE, AND MANUFACTURING METHOD THEREFOR

(71) Applicant: NIPPON CHEMI-CON CORPORATION, Tokyo (JP)

(72) Inventors: Yuhei Kobayashi, Tokyo (JP); Shun Nishiyama, Tokyo (JP); Shinji Oikawa, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 18 days.

(21) Appl. No.: 18/811,130

(22) Filed: Aug. 21, 2024

(65) Prior Publication Data

US 2025/0067953 A1 Feb. 27, 2025

(30) Foreign Application Priority Data

Aug. 23, 2023 (JP) ................................ 2023-135524
Aug. 23, 2023 (JP) ................................ 2023-135525

(51) Int. Cl.

| | |
|---|---|
| ***G02B 7/02*** | (2021.01) |
| ***B60R 1/23*** | (2022.01) |
| ***B60R 11/04*** | (2006.01) |
| ***G03B 30/00*** | (2021.01) |
| ***H04N 23/51*** | (2023.01) |
| ***H04N 23/52*** | (2023.01) |
| ***H04N 23/55*** | (2023.01) |

(52) U.S. Cl.
CPC .............. *G02B 7/022* (2013.01); *B60R 11/04* (2013.01); *G02B 7/028* (2013.01); *G03B 30/00* (2021.01); *B60R 1/23* (2022.01); *B60R 2300/802* (2013.01); *H04N 23/51* (2023.01); *H04N 23/52* (2023.01); *H04N 23/55* (2023.01)

(58) Field of Classification Search
CPC ......... G02B 7/022; G02B 7/028; B60R 11/04; B60R 1/23; B60R 2300/802; G03B 30/00; H04N 23/51; H04N 23/52; H04N 23/55
USPC .................................................. 348/373–375
See application file for complete search history.

(56) References Cited

U.S. PATENT DOCUMENTS

2010/0157137 A1* 6/2010 Imai ......................... G02B 7/02 348/E5.037
2011/0199485 A1* 8/2011 Nakamura ........... G02B 13/001 348/148

FOREIGN PATENT DOCUMENTS

JP 2006-323079 A 11/2006
JP 2006323079 * 11/2006
WO WO-2018181888 A1 * 10/2018 ............. H04N 23/55

* cited by examiner

*Primary Examiner* — Lin Ye
*Assistant Examiner* — Chan T Nguyen
(74) *Attorney, Agent, or Firm* — WHDA, LLP

(57) ABSTRACT

A camera module includes an imaging unit including a holder holding a lens unit including a flange portion being at right angles to an optical axis, a front case to which the lens unit is fixed, and a rear case including a prop portion supporting the lens unit with the flange portion, the imaging unit being fixed by the flange portion put between the prop portion and the front case, the rear case including a buffer region configured to absorb a unit length of the imaging unit.

9 Claims, 6 Drawing Sheets

FIG.1

CAMERA MODULE, AND MANUFACTURING METHOD THEREFOR

CROSS-REFERENCE TO RELATED APPLICATIONS

This application is entitled to the benefit of priority of Japanese Patent Application No. 2023-135524, filed on Aug. 23, 2023, and Japanese Patent Application No. 2023-135525, filed on Aug. 23, 2023, the contents of which are hereby incorporated by reference.

BACKGROUND

Technical Field

The present disclosure relates to, for example, a camera module used for an onboard camera device or the like, and a manufacturing method therefor.

Description of the Related Art

A known vehicle, such as a motorcar is equipped with a camera device, such as a charge-coupled device (CCD) camera to display a pick-up image of a blind region on a display device in a room of the vehicle.

Such an onboard camera device has a known structure by which a position relationship between a wide-angle lens and a shading portion is kept constant to prevent shifting of a field of view or occurring of a gap, even if a lens unit is moved in an axial direction to a lens holder (for example, Japanese Unexamined Patent Application Publication No. 2006-323079).

SUMMARY

An onboard camera device is equipped with a camera module. The camera module includes a lens unit and a sensor. When the lens unit is fixed to a lens holder, the lens unit is adjusted to a focusing state and is fixed to the lens holder. The lens unit is moved on an optical axis in this focus adjustment.

A focal length of the lens unit has an individual difference by product, and a variation. As a result, a unit length of an imaging unit of which a focus is adjusted tends to vary with the focal length of the lens unit. That is, the length from the tip of a lens portion to the bottom face of a sensor substrate is different.

As a result, in a case holding the imaging unit, an internal volume and form is required in consideration of the variation of the unit length of the imaging unit. When assuming a margin, there is a problem that a gap is produced around the lens unit in the imaging unit having the variation on a small side, so that dust or moisture enters inside of a module, and there is a problem that stress is applied to the imaging unit when downsized front case and rear case are combined with each other, so that the focusing state of the lens unit is spoiled, and also a solidity of the cases is reduced.

Thus, a purpose of the present disclosure is to raise a fixed strength of an imaging unit to a case to avoid influence of a unit length of the imaging unit by focus adjustment of the imaging unit.

According to one aspect of the present disclosure, a camera module includes an imaging unit including a holder holding a lens unit including a flange portion being at right angles to an optical axis, a front case to which the lens unit is fixed, and a rear case including a prop portion supporting the lens unit with the flange portion, the imaging unit being fixed by the flange portion put between the prop portion and the front case, the rear case including a buffer region configured to absorb a unit length of the imaging unit.

According to one aspect of the present disclosure, a camera module includes an imaging unit including an engaging concave portion in a lens holder holding a lens unit including a flange portion being at right angles to an optical axis; a first case portion including a flange arrangement portion arranging the flange portion; a second case portion including a prop portion supporting the flange portion, the prop portion engaging the engaging concave portion, the second case portion being joined to the first case portion; a fixing mechanism fixing the imaging unit to the first case portion by putting the flange portion between the flange arrangement portion and the prop portion; and an engaging mechanism making the second case portion to support the imaging unit by engaging the engaging concave portion and the prop portion.

According to one aspect of the present disclosure, a manufacturing method for a camera module includes attaching, to a holder, a lens unit including a flange portion being at right angles to an optical axis of the lens unit to form an imaging unit; adjusting a focus of the lens unit; supporting, by a prop portion of a rear case, the lens unit with the flange portion, and putting the flange portion between the prop portion and a front case to fix the lens unit, and arranging a back end portion of the imaging unit in a buffer region of which a height is set up by the prop portion; and connecting the front case and the rear case.

BRIEF DESCRIPTION OF THE DRAWINGS

FIG. 1 is an exploded perspective view showing a camera module.

DETAILED DESCRIPTION

Figure 1:
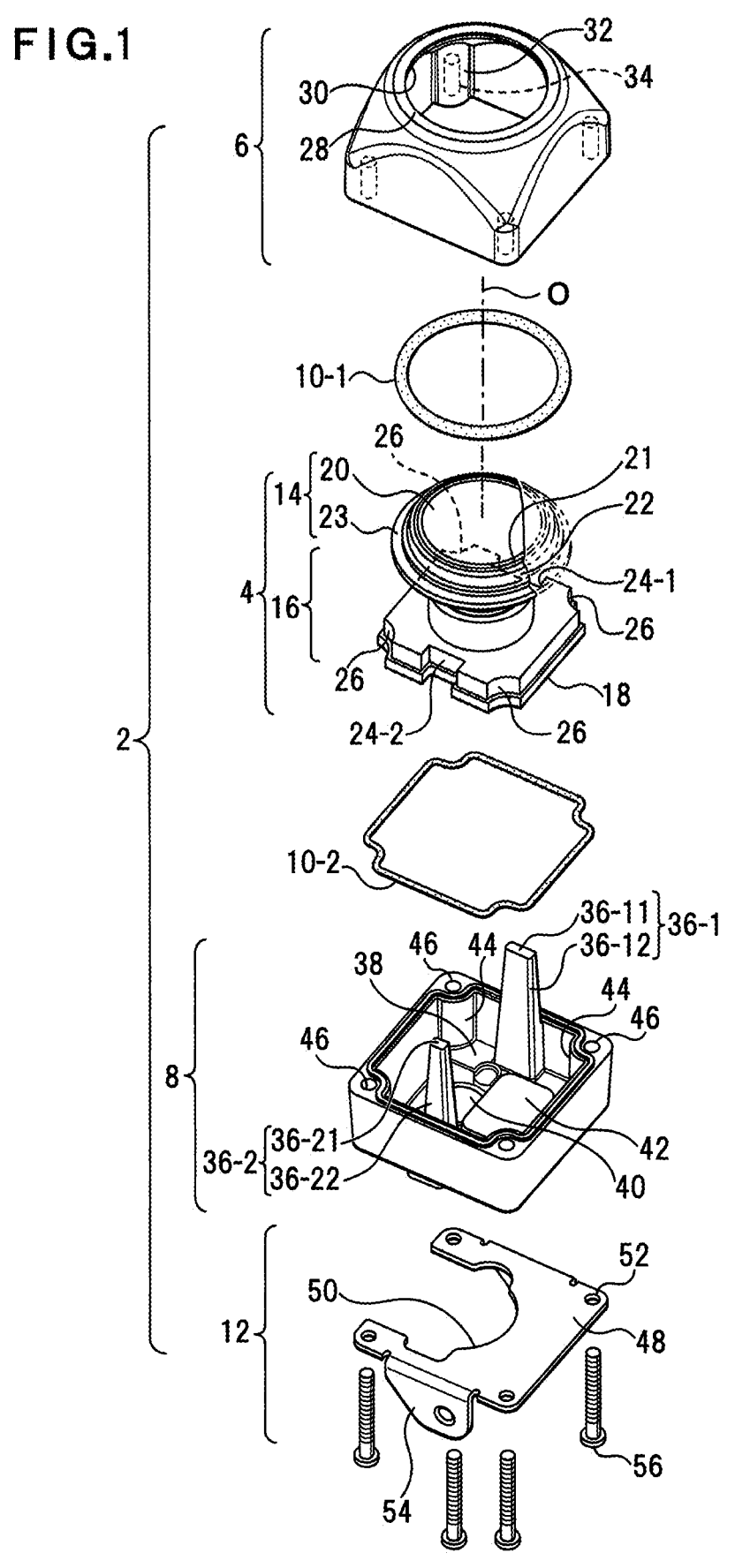
Figure 2:
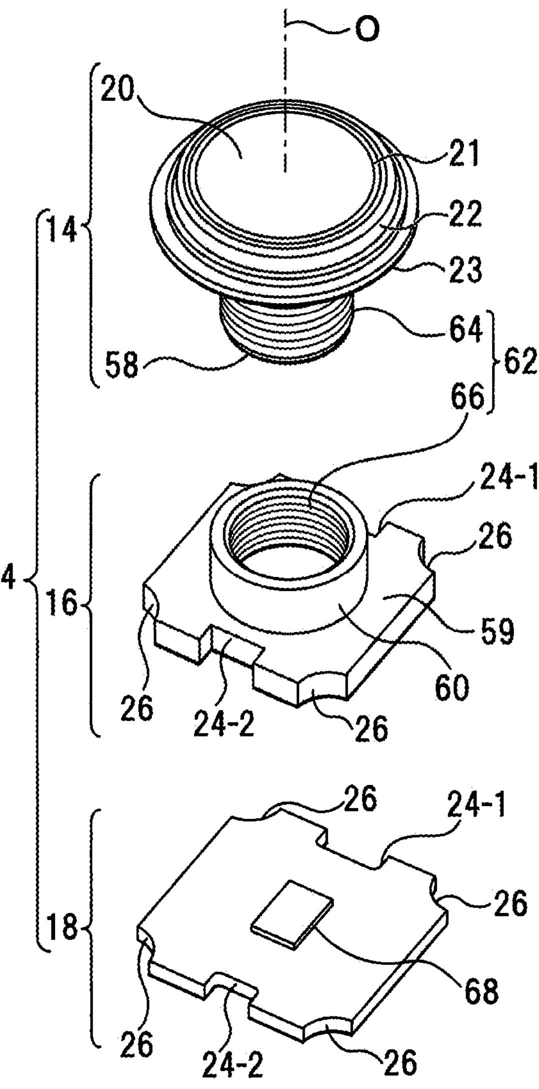
FIG. 2 is an exploded perspective view showing an imaging unit.

FIG. 1 illustrates an exploded camera module 2 according to an embodiment. The configuration illustrated in FIG. 1 is an example, and the present disclosure is not limited to such a configuration.

The camera module 2 includes an imaging unit 4, a front case 6, a rear case 8, a first seal ring 10-1, a second seal ring 10-2, and a cases connecting portion 12.

<Imaging Unit 4>

The imaging unit 4 includes a lens unit 14, a lens holder 16, and a sensor substrate 18. The lens unit 14 is slidably attached to the lens holder 16, and the sensor substrate 18 is attached to a back portion of the lens holder 16. Thus, the lens unit 14 is adjusted on the lens holder 16 for focus adjustment and is held to the lens holder 16.

The lens unit 14 includes a lens portion 20, such as a circular wide-angle lens, for example. The lens portion 20 is equipped with a lens holding portion 21, a seal ring attachment portion 22, and a flange portion 23. The lens holding portion 21 is a frame portion holding a circumference of the lens portion 20. The first seal ring 10-1 is attached to the seal ring attachment portion 22. The flange portion 23 is a fixed member for fixing the lens unit 14 between the front case 6 and the rear case 8 and is at right angles to an optical axis O of the lens portion 20.

A first engaging concave portion 24-1, a second engaging concave portion 24-2, and third engaging concave portions 26 are formed in the lens holder 16 and the sensor substrate 18 and are engaged with the rear case 8. The first engaging concave portion 24-1 and the second engaging concave portion 24-2 are formed so that the optical axis O is put between them, and the third engaging concave portions 26 are formed by notching corners in an arc shape.

In this embodiment, the first engaging concave portion 24-1, the second engaging concave portion 24-2, and the third engaging concave portions 26 are also formed in the sensor substrate 18 installed on the back of the lens holder 16 in a similar to the lens holder 16 and are engaged with the rear case 8.

<Front Case 6>

The front case 6 is an example of a first case portion of the present disclosure, includes a lens window portion 28, and is, for example, a case consisting of a molding made with hard synthetic resin by integral molding. The front case 6 may be formed by cutting of synthetic resin, for example.

The lens window portion 28 is, for example, a circular opening that exposes the lens portion 20 on and around the optical axis O of the lens unit 14 and is formed to have a smaller diameter than the lens portion 20. A flange arrangement portion 30 for arranging the flange portion 23 of the lens unit 14 inside the front case 6 is formed in the circumference portion of the lens window portion 28.

Columnar reinforcement portions 32 are provided for interior corner portions of the front case 6, and a screw hole 34 for fixing the rear case 8 is formed in each reinforcement portion 32.

<Rear Case 8>

The rear case 8 is an example of a second case portion of the present disclosure. A first prop portion 36-1 and a second prop portion 36-2 supporting the imaging unit 4 with the flange portion 23 of the lens unit 14 are erected in the rear case 8. The first prop portion 36-1 and the second prop portion 36-2 are set as the same height, and a buffer space portion 38 for accommodating the rear of the imaging unit 4 is constituted for the height. The buffer space portion 38 is an example of a buffer region of the present disclosure.

The first prop portion 36-1 includes a flange mounting portion 36-11 and an engaging pillar portion 36-12, and the second prop portion 36-2 includes a flange mounting portion 36-21 and an engaging pillar portion 36-22. Top portions of the first prop portion 36-1 and the second prop portion 36-2 have different from each other in form and area. The flange mounting portions 36-11 and 36-21 have rectangular shape, and a long side portion of the flange mounting portion 36-11 is set up more longer than a long side portion of the flange mounting portion 36-21. The engaging pillar portions 36-12 and 36-22 have pyramid shape with loose slopes, and a long side portion of the engaging pillar portion 36-12 is set up more longer than a long side portion of the engaging pillar portion 36-22 in the same height of the engaging pillar portions 36-12 and 36-22. That is, only the engaging pillar portion 36-12 fits and is insertable to the first engaging concave portion 24-1, and only the engaging pillar portion 36-22 fits and is insertable to the second engaging concave portion 24-2.

Thus, there is relation that the first engaging concave portion 24-1 fits the engaging pillar portion 36-12 and engages the first prop portion 36-1 and that the second engaging concave portion 24-2 fits the engaging pillar portion 36-22 and engages the second prop portion 36-2. Directional properties of the lens unit 14 and the sensor substrate 18 are uniformly specified from such a relationship.

A cable insertion hole 40 and a heat radiation convex portion 42 are formed in the back of the rear case 8, and columnar reinforcement portions 44 are formed in interior corner portions of the rear case 8 and at common positions with the reinforcement portions 32 of the front case 6. The third engaging concave portions 26 of the lens holder 16 engage the reinforcement portions 44, and the lens holder 16 is supported by the rear case 8. A fixing screw insertion hole 46 is formed in each reinforcement portion 44 and at the same position as the screw hole 34 of the reinforcement portion 32.

<First Seal Ring 10-1>

The first seal ring 10-1 is, for example, a rubber ring having a seal function, is installed on the circumference portion of the lens portion 20 of the lens unit 14, is held between the front case 6 and the lens unit 14, and achieves the seal function.

<Second Seal Ring 10-2>

The second seal ring 10-2 is, for example, a rubber ring having a seal function, is installed between joint surfaces of the front case 6 and the rear case 8, is held between the front case 6 and the rear case 8, and achieves the seal function of the space in the case.

<Cases Connecting Portion 12>

The cases connecting portion 12 includes a back panel 48 placed on the back of the rear case 8. The back panel 48 is formed from rigid material, such as metal plate, and has an outer edge shape corresponding to the back shape of the rear case 8. A notch portion 50 is formed inside the back panel 48 in a similar to the cable insertion hole 40 of the rear case 8, and the back panel 48 is equipped with fixation pieces 54 opposed to each other. Each fixation piece 54 may include an installation hole or the like.

Fixing screw insertion holes 52 corresponding to the screw holes 34 of the front case 6 and the fixing screw insertion holes 46 of the rear case 8 are formed in corner portions of the back panel 48. A fixing screw 56 is screwed into the screw hole 34 through the fixing screw insertion hole 52 and the fixing screw insertion hole 46, and the rear case 8 is connected to the front case 6. In connecting, the back panel 48 functions as a washer for the fixing screws 56 and reinforces the back of the rear case 8.

<Imaging Unit 4>

FIG. 2 illustrates the imaging unit 4 exploded. In FIG. 2, the same parts as those in FIG. 1 are denoted by the same reference numerals.

The lens unit 14 includes a cylindrical light guide portion 58 installed on the back side, and the light guide portion 58 is formed to be integrated with the flange portion 23. The lens holder 16 includes a cylindrical lens unit support portion 60 installed upright on the center of a holder base portion 59 having a plate form.

A slide mechanism 62 in which the lens unit support portion 60 slidably supports the lens unit 14 is provided between the lens unit support portion 60 and the light guide portion 58. By a screw portion 64 formed on an outer surface of the light guide portion 58 and a screw portion 66 formed on an inner surface of the lens unit support portion 60, the slide mechanism 62 relatively moves the screw portion 64 and the screw portion 66 on the optical axis O and is able to adjust a position of the lens unit 14 on the optical axis O to the lens unit support portion 60.

The sensor substrate 18 is installed on the back of the lens unit support portion 60, and an imaging sensor unit 68, such as a charge coupled device (CCD) element, is installed on the sensor substrate 18 at a position on the optical axis O. The imaging sensor unit 68 is an example of a sensor of the present disclosure. Focus adjustment to the imaging sensor unit 68 can be realized by moving the lens unit 14 along the optical axis O, and the lens unit support portion 60 can hold the lens unit 14 at an optimal position.

<Assembling Structure of Camera Module 2>

Figure 3:
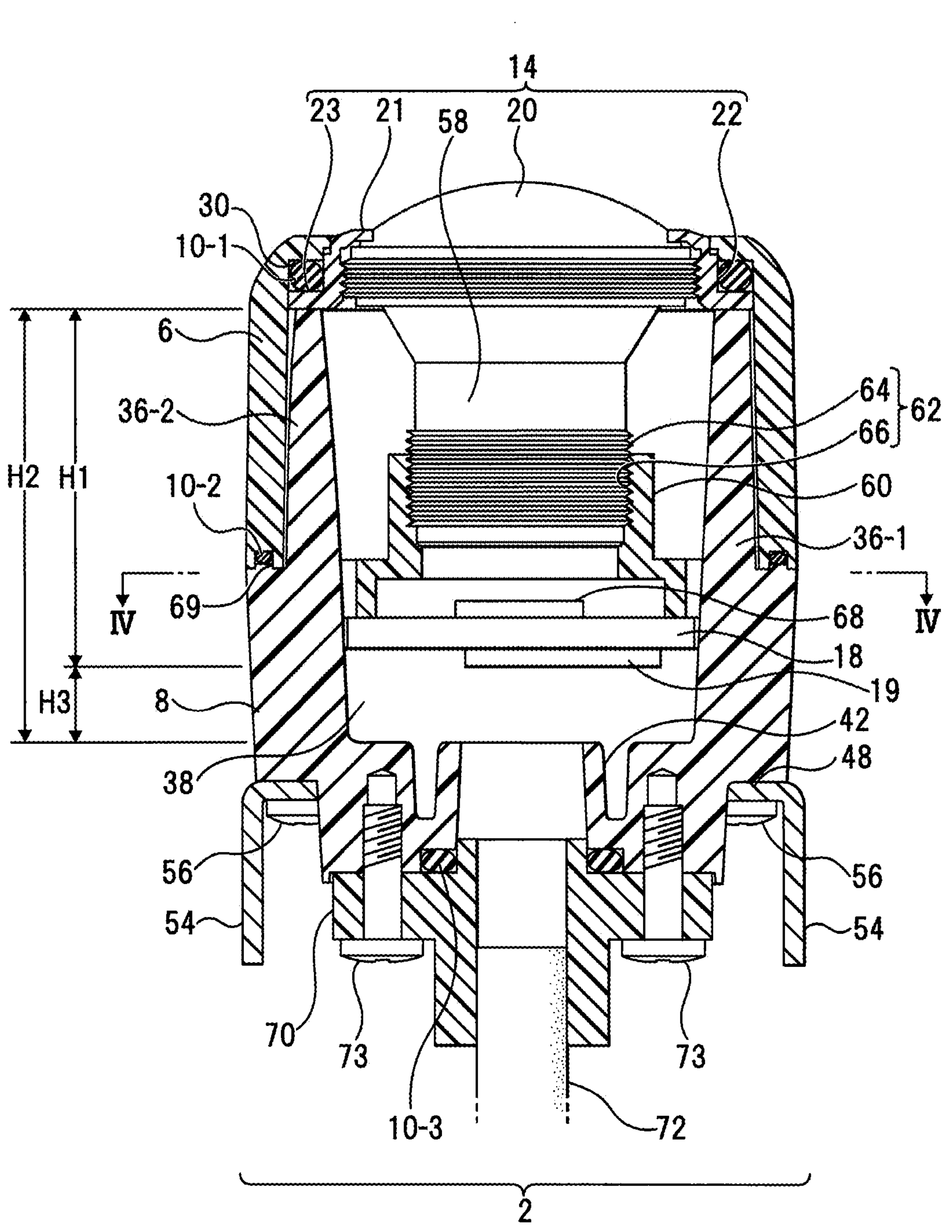
FIG. 3 is a vertical cross-sectional view showing the camera module.

FIG. 3 illustrates a vertical cross-section of the camera module 2. In FIG. 3, the same parts as those in FIGS. 1 and 2 are denoted by the same reference numerals.

The first seal ring 10-1 is attached to the seal ring attachment portion 22 in the lens unit 14 in which the lens portion 20 is installed.

The first seal ring 10-1 and the flange portion 23 are put between the flange arrangement portion 30 of the front case 6 and the first prop portion 36-1 of the rear case 8, and the first seal ring 10-1 and the flange portion 23 are similarly put between the flange arrangement portion 30 of the front case 6 and the second prop portion 36-2 of the rear case 8. A fixing mechanism fixing the imaging unit 4 to the front case 6 is provided by putting the flange portion 23.

The second seal ring 10-2 is installed on a seal ring installation portion 69 of the front case 6.

The rear case 8 is joined to the front case 6, and the back panel 48 is installed on the back side of the rear case 8, each fixing screw 56 is screwed into the screw hole 34 of the front case 6 from the fixing screw insertion hole 52 through the fixing screw insertion hole 46 of the rear case 8, and the front case 6 and the rear case 8 are fixed to each other by the fixing screws 56.

The first seal ring 10-1 is put and held between the front case 6 and the flange portion 23 in a compression state, and the second seal ring 10-2 is put between the front case 6 and the rear case 8 in a compression state.

A fixation with the lens unit 14 and the front case 6 and a fixation with the front case 6 and the rear case 8 are firmly maintained with actions of restoring force of the first seal ring 10-1 and the second seal ring 10-2.

Before assembly of the camera module 2, the sensor substrate 18 is attached to the back of the holder base portion 59, and the lens unit 14 is attached to the lens unit support portion 60. Since the lens unit 14 is slidably supported with the lens unit support portion 60 by the slide mechanism 62, focus adjustment is performed to the imaging sensor unit 68. A height from the bottom face of the flange portion 23 to the bottom face of the sensor substrate 18, which includes a height of the electronic component 19 mounted on the back side of the sensor substrate 18 in this case, is set to H1. This is set to height H1 of the imaging unit 4. When a height of the first prop portion 36-1 and the second prop portion 36-2 of the rear case 8 is set to H2, a height H3 of the buffer space portion 38 can be expressed by Formula 1.

$$H3 = H2 - H1 \quad \text{Formula 1}$$

Thus, the buffer space portion 38 secures a space region having sufficient height that the imaging unit 4 can be accommodated in a case space by height H3. Even if the imaging unit 4 becomes longer in the direction of the optical axis for focus adjustment or the like, the imaging unit 4 can be installed in the buffer space portion 38 that is an example of a buffer region with margin.

<Cable Holding Structure>

A cable holding portion 70 is placed on a back portion of the rear case 8, and a cable 72 led out from the rear case 8 is held by the cable holding portion 70. The cable 72 is connected with the sensor substrate 18 and is used for a connection with an external circuit.

A third seal ring 10-3 is installed between the cable holding portion 70 and the rear case 8. The cable holding portion 70 is fixed to the rear case 8 by fixing screws 73, and the third seal ring 10-3 is maintained in the compression state. Thereby, a seal around a lead-out portion of the cable 72 is achieved.

<Engaging Mechanism 25 of Imaging Unit 4 and Rear Case 8>

Figure 4:
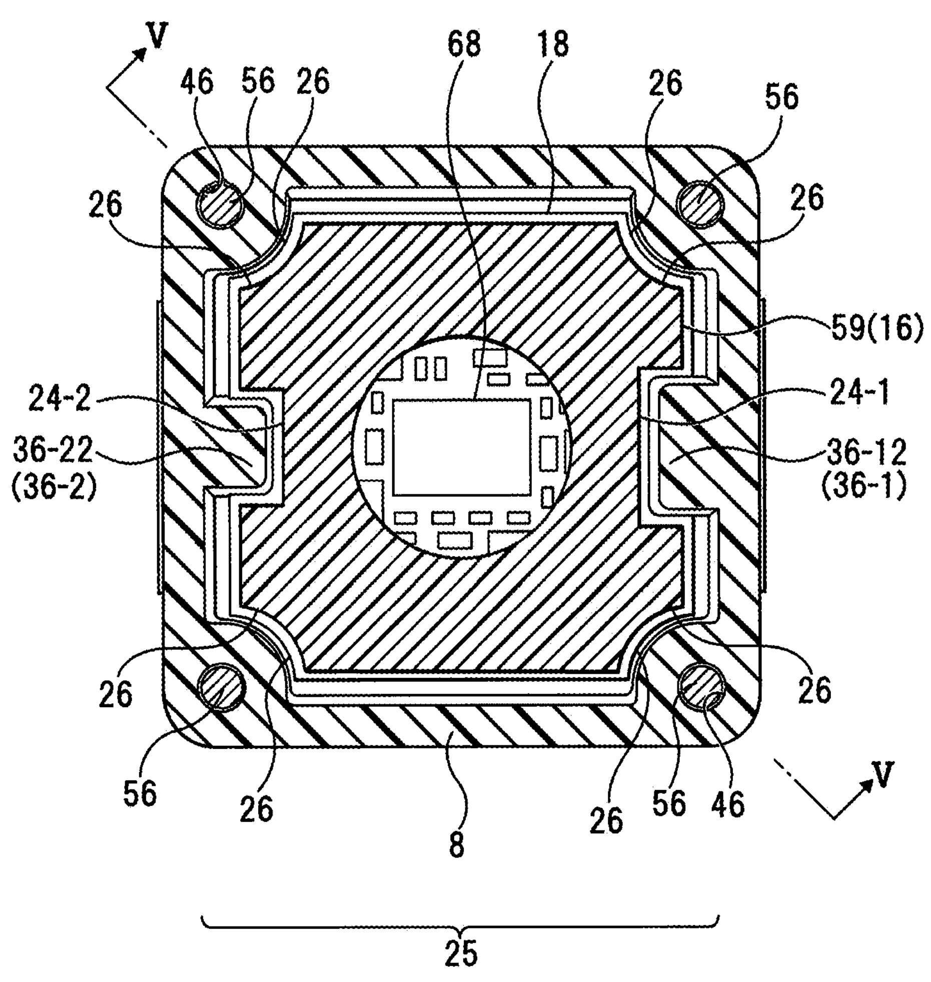
FIG. 4 is a cross-sectional view taken along line IV-IV in FIG. 3.

FIG. 4 illustrates cross-section taken along line IV-IV in FIG. 3 and illustrates an engaging mechanism 25 of the imaging unit 4 and the rear case 8.

The first prop portion 36-1 of the rear case 8 is inserted in and engaged with the first engaging concave portion 24-1 of the holder base portion 59, and the second prop portion 36-2 of the rear case 8 is inserted in and engaged with the second engaging concave portion 24-2 of the holder base portion 59.

In the imaging unit 4, directional properties of the lens unit 14 and the sensor substrate 18 are determined by a fixing of the flange portion 23 of the lens unit 14 by the first prop portion 36-1 and the second prop portion 36-2 of the rear case 8 and the front case 6, by an engagement of the first engaging concave portion 24-1 of the lens holder 16 and the first prop portion 36-1, and by an engagement of the second engaging concave portion 24-2 of the lens holder 16 and the second prop portion 36-2. The imaging unit 4 in which such a relationship is uniformly determined is fixed to the front case 6 and the rear case 8 that are combined with each other.

<Seal Structure of Front Case 6 and Rear Case 8>

Figure 5:
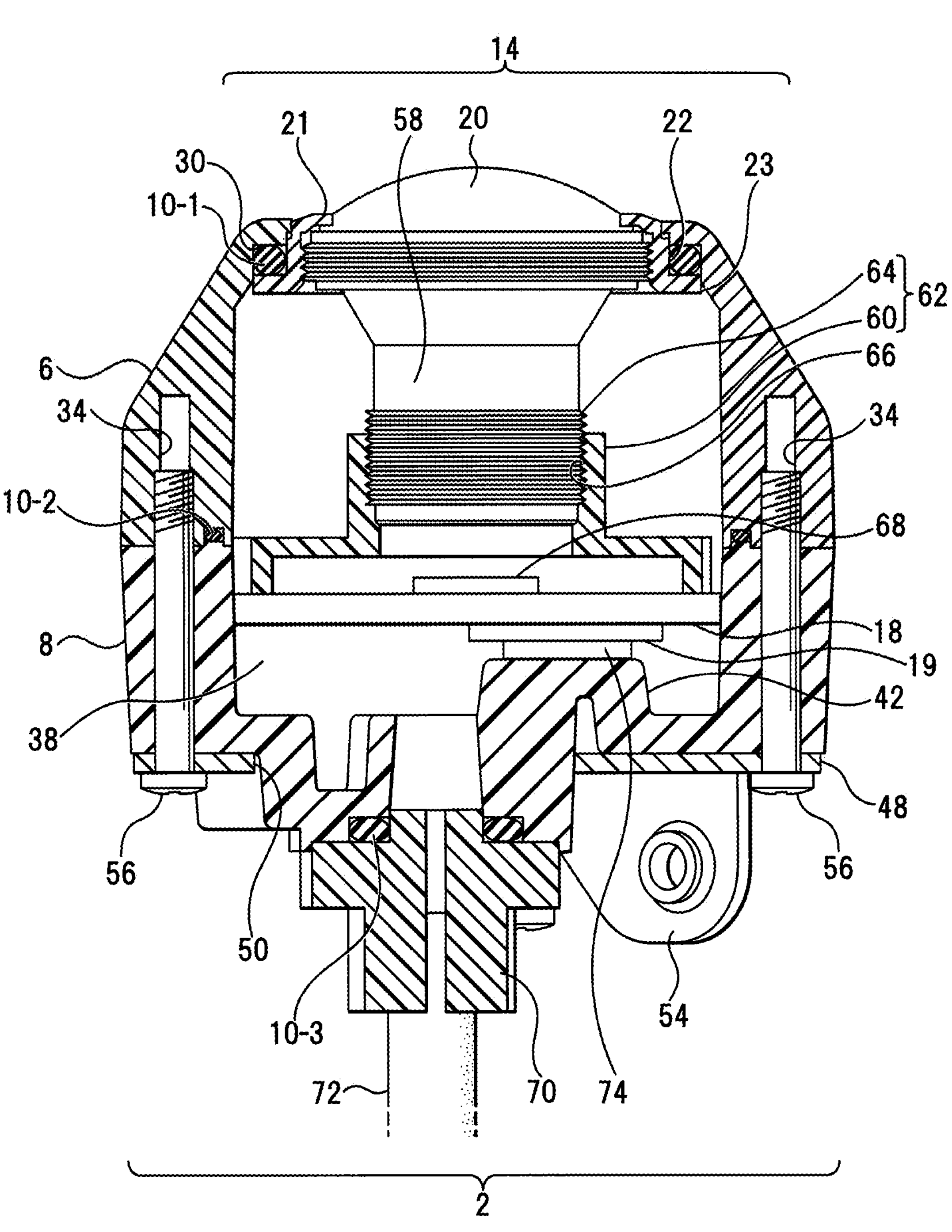
FIG. 5 is a vertical cross-sectional view taken along line V-V in FIG. 4.

FIG. 5 illustrates cross-section taken along line V-V in FIG. 4. The first seal ring 10-1 is put and held between the front case 6 and the flange portion 23 in the compression state, and the second seal ring 10-2 is put between the front case 6 and the rear case 8 in the compression state. The restoring forces of the first seal ring 10-1 and the second seal ring 10-2 act on close contact portions to them respectively, a seal between the front case 6 and the lens unit 14 is performed, and a seal of the front case 6 and the rear case 8 is performed.

<Heat Radiation Structure of Camera Module 2>

Figure 6:
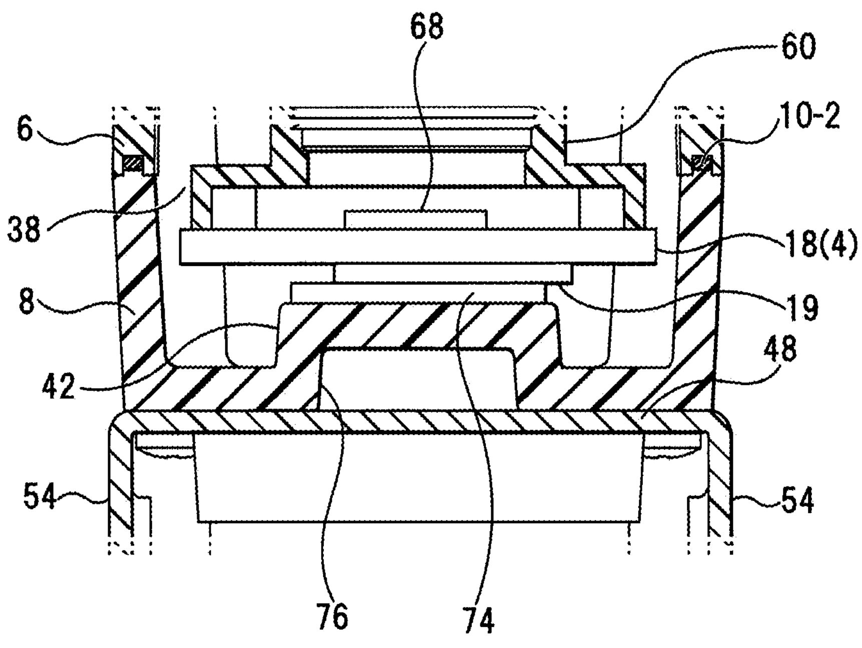
FIG. 6 is a cross-sectional view showing a heat radiation structure of the camera module.

FIG. 6 illustrates a part of cross-section of the camera module 2 of which the heat radiation convex portion 42 of the rear case 8 is cut in the longitudinal direction. The heat radiation convex portion 42 is projected into the inside of the rear case 8, and a heat radiation concave portion 76 is formed on the outer surface of the rear case 8 in this heat radiation convex portion 42. A concavo-convex plane portion with winding is formed in the rear case 8 by the heat radiation convex portion 42 and the heat radiation concave portion 76, and the heat radiation area of the rear case 8 is expanded. A thermal conduction member 74 is installed between the heat radiation convex portion 42 and the back of the sensor substrate 18 of the imaging unit 4.

The imaging sensor unit 68 comes in contact with the heat radiation convex portion 42 through the sensor substrate 18 and the thermal conduction member 74 and can radiate heat.

<Manufacturing Process of Camera module 2>

A manufacturing process of the camera module 2 is an example of a manufacturing method for the camera module 2 of the present disclosure.

The manufacturing process of the camera module 2 includes a formation process of the imaging unit 4, a focus adjustment process, an installation process of the imaging unit 4, a cases connection process, and the like.

Formation process of imaging unit 4: At the formation process of the imaging unit 4, the light guide portion 58 of the lens unit 14 is attached to the lens unit support portion 60 of the lens holder 16, and the lens unit 14 and the lens holder 16 are combined with each other, so that the imaging unit 4 is formed.

Focus adjustment process: At the focus adjustment process, the lens unit 14 attached to the lens holder 16 is adjusted by the slide mechanism 62, so that focus adjustment is performed for the lens holder 16 to the imaging sensor unit 68. A focus of the lens unit 14 is adjusted.

Installation process of imaging unit 4: At the installation process of the imaging unit 4, the imaging unit 4 is installed in an accommodation space formed by the front case 6 and the rear case 8. That is, the flange portion 23 of the lens unit 14 is put between the front case 6 and each of the first prop portion 36-1 and the second prop portion 36-2 on the rear case 8 side to be supported, and the first engaging concave portion 24-1 and the second engaging concave portion 24-2 of the holder base portion 59 are engaged with the first prop portion 36-1 and the second prop portion 36-2 in the rear portion of the imaging unit 4 respectively. Thereby, the imaging unit 4 is installed in the buffer space portion 38 of which the height is set by the first prop portion 36-1 and the second prop portion 36-2.

Cases connection process: At the cases connection process, the front case 6 and the rear case 8 are combined with and fixed to each other by the cases connecting portion 12 to connect the front case 6 and the rear case 8.

Thus, the camera module 2 can be manufactured with the above-mentioned processes.

Effect of Embodiment

According to the embodiment, any of the following effects can be obtained.

(1) According to the camera module 2, variation can be absorbed in the whole length of the imaging unit 4 by the buffer space portion 38. That is, the buffer space portion 38 can separate the bottom face of the sensor substrate 18 from the rear case 8 without regard to the whole length of the imaging unit 4.

(2) A seal of the front case 6 and the lens unit 14 and a seal between the front case 6 and the rear case 8 can be achieved by the first seal ring 10-1 placed between the flange portion 23 of the lens unit 14 and the front case 6 and by the second seal ring 10-2 placed between the front case 6 and the rear case 8, prevention of entry of dust or moisture can be achieved, and inconvenience, such as stray light, can be prevented.

(3) The flange portion 23 of the lens unit 14, the front case 6, and the rear case 8 are firmly fixable with compression of the first seal ring 10-1 and the second seal ring 10-2, fixation and case structure with high solidity can be realized, and a reliability of a camera module can be increased.

(4) Since the first prop portion 36-1 and the second prop portion 36-2 are arranged with the optical axis O as the middle point in the camera module 2, the imaging unit 4 can be fixed and held to the rear case 8 in equilibrium. A plurality of prop portions may be arranged with the optical axis O as the middle point. That is, as to an arrangement of the plurality of prop portions, the optical axis can pass through the middle point of the two prop portions, or the optical axis can pass through a central point of the three or more prop portions.

(5) The heat radiation property of the rear case 8 can be increased, and thermal resistance of the camera module can be increased.

(6) The front case 6 and the rear case 8 can be firmly fixed to and combined with each other, and solidity and reliability of the camera module 2 can be increased.

(7) Without affecting the focus adjustment status of the imaging unit 4, the imaging unit 4 can be fixed in the joint space of the front case 6 and the rear case 8, and the imaging unit 4 can be protected.

(8) The seal of the front case 6 and the lens unit 14 and the seal between the front case 6 and the rear case 8 can be achieved by the first seal ring 10-1 placed between the flange portion 23 of the lens unit 14 and the front case 6 and by the second seal ring 10-2 placed between the front case 6 and the rear case 8, prevention of entry of dust or moisture can be achieved, and the influence of noise light, such as stray light that disturbs an actual image, can be avoided.

OTHER EMBODIMENTS

The following embodiments are contained in the present disclosure.

(1) Although the screw slide mechanism is illustrated as the slide mechanism 62 in the above embodiment, the slide mechanism 62 may be a slide mechanism that includes a plurality of longitudinal grooves for sliding.

(2) Although rectangular mounting surfaces are formed in the top portions of the first prop portion 36-1 and the second prop portion 36-2, the mounting surfaces may be a circular plane.

(3) The concave portion of the first engaging concave portion 24-1 may be a semi-circle, and the engaging pillar portion 36-12 of the first prop portion 36-1 corresponding to the first engaging concave portion 24-1 may be also a cylindrical, the concave portion of the second engaging concave portion 24-2 may be a semi-circle, and the engaging pillar portion 36-22 of the second prop portion 36-2 corresponding to the second engaging concave portion 24-2 may be also a cylindrical.

In accordance with aspects of the embodiments, a camera module or a manufacturing method for a camera module is as follows.

The camera module includes an imaging unit including a holder holding a lens unit including a flange portion being at right angles to an optical axis, a front case to which the lens unit is fixed, and a rear case including a prop portion supporting the lens unit with the flange portion, the imaging unit being fixed by the flange portion put between the prop portion and the front case, the rear case including a buffer region configured to absorb a unit length of the imaging unit.

In the camera module, the front case may include a flange arrangement portion around a lens window of the front case, the flange portion may be put between the flange arrangement portion and the prop portion of the rear case, and the imaging unit may be fixed as well as the lens unit.

The camera module may further include a first seal ring installed between the flange portion included in the lens unit and a flange arrangement portion included in the front case, and a second seal ring installed between the front case and the rear case, wherein the first seal ring and the second seal ring may be in compression states.

In the camera module, the prop portion may include a first prop portion and a second prop portion that are different from each other, and an arrangement position of the imaging unit may be specified by an engagement of the first prop portion or/and the second prop portion with the imaging unit.

In the camera module, a plurality of the prop portions may be arranged with the optical axis as a middle point or a center. As to an arrangement of the plurality of prop portions, the optical axis may pass through the middle point of the two prop portions, or the optical axis may pass through a central point of the three or more prop portions.

In the camera module, the rear case may include a heat radiation portion configured to radiate heat of a space portion in the rear case.

The camera module includes an imaging unit including an engaging concave portion in a lens holder holding a lens unit including a flange portion being at right angles to an optical axis; a first case portion including a flange arrangement portion arranging the flange portion; a second case portion including a prop portion supporting the flange portion, the prop portion engaging the engaging concave portion, the second case portion being joined to the first case portion; a fixing mechanism fixing the imaging unit to the first case portion by putting the flange portion between the flange arrangement portion and the prop portion; and an engaging mechanism making the second case portion to support the imaging unit by engaging the engaging concave portion and the prop portion.

In the camera module, the engaging concave portion may include at least first engaging concave portion and second engaging concave portion that have different forms, the prop portion may include at least first prop portion and second prop portion that engage the first engaging concave portion and the second engaging concave portion respectively, and an arrangement direction of the lens unit or imaging sensor unit that is included in the imaging unit may be determined by an engagement of the first engaging concave portion and the first prop portion or by an engagement of the second engaging concave portion and the second prop portion.

The manufacturing method for a camera module, includes attaching, to a holder, a lens unit including a flange portion being at right angles to an optical axis of the lens unit to form an imaging unit; adjusting a focus of the lens unit; supporting, by a prop portion of a rear case, the lens unit with the flange portion, and putting the flange portion between the prop portion and a front case to fix the lens unit, and arranging a back end portion of the imaging unit in a buffer region of which a height is set up by the prop portion; and connecting the front case and the rear case.

According to aspects of the embodiments, any of the following effects can be obtained.

(Camera Module)

(1) The imaging unit supported by the prop portion of the rear case with the flange portion of the lens unit can be fixed by putting the flange portion between the prop portion and the front case, and a variation in the imaging unit can be absorbed by the buffer region set to the rear case.

(2) Even if a variation is made by tolerance or focus adjustment in a whole length of the imaging unit, the imaging unit can be accommodated in an accommodation space formed by the front case and the rear case, it can be fixed firmly, and solidity and compactification of the camera module can then be achieved.

(3) The lens unit can be fixed between the flange arrangement portion of the first case portion and the prop portion of the second case portion by combining the first case portion and the second case portion, the imaging unit can be fixed by engaging a concave portion of the lens holder holding the lens unit with the prop portion of the second case portion, and the imaging unit can be protected by the first case portion and the second case portion.

(4) The flange portion of the lens unit included in the imaging unit after focus adjustment can be fixed to the first case portion and the second case portion, and the lens holder holding the lens unit engages the prop portion of the second case portion to be supported. Since a stress does not act on the imaging unit in the direction of the optical axis, the imaging unit after focus adjustment can be protected, and inconvenience, such as loss of focus adjustment is not caused.

(5) The first case portion and the second case portion can be firmly fixed to and combined with each other, and solidity and reliability of the camera module can be increased.

(Manufacturing Method for Camera Module)

(6) The imaging unit of which focus is adjusted can be fixed by putting the flange portion included in the lens unit between the prop portion of the rear case and the front case, the imaging unit can be accommodated in the accommodation space formed by the front case and the rear case, and the imaging unit can be integrally fixed to the front case and the rear case.

(7) Simplification of the manufacturing processes can be achieved, and reliability of the camera module as a product can be increased by reduction of a manufacturing error.

As described above, the most preferred embodiment and the like of the present disclosure have been described. The present disclosure is not limited to the above description. Various modifications and changes can be made by those skilled in the art based on contents described in the claims or disclosed in the specification. It goes without saying that such modifications and changes are included in the scope of the present disclosure.

According to the camera module, and the manufacturing method for the camera module of the present disclosure, a fixed strength of the imaging unit to the case can be increased, an influence of a unit length of the imaging unit by the focus adjustment of the imaging unit can be avoided, and a convenience can be increased.

What is claimed is:

1. A camera module comprising:

an imaging unit including a lens unit including a flange portion being at right angles to an optical axis, a holder holding the lens unit, and a sensor substrate attached to the holder, a focus of the imaging unit being adjusted;

a front case to which the lens unit is fixed; and a rear case including a prop portion supporting the lens unit with the flange portion, the imaging unit being fixed by the flange portion put between the prop portion and the front case, the rear case including a buffer region configured to absorb a unit length of the imaging unit.

2. The camera module according to claim 1, wherein the front case includes a flange arrangement portion around a lens window of the front case, the flange portion is put between the flange arrangement portion and the prop portion of the rear case, and the imaging unit is fixed as well as the lens unit.

3. The camera module according to claim 1, further comprising:

a first seal ring installed between the flange portion included in the lens unit and a flange arrangement portion included in the front case; and a second seal ring installed between the front case and the rear case, wherein the first seal ring and the second seal ring are in compression states.

4. The camera module according to claim 1, wherein the prop portion includes a first prop portion and a second prop portion that are different from each other, and an arrangement position of the imaging unit is specified by an engagement of the first prop portion or/and the second prop portion with the imaging unit.

5. A camera module comprising:

an imaging unit including a holder holding a lens unit including a flange portion being at right angles to an optical axis;

a front case to which the lens unit is fixed; and a rear case including a prop portion supporting the lens unit with the flange portion, the imaging unit being fixed by the flange portion put between the prop portion and the front case, the rear case including a buffer region configured to absorb a unit length of the imaging unit, wherein a plurality of the prop portions is arranged with the optical axis as a middle point or a center.

6. The camera module according to claim 1, wherein the rear case includes a heat radiation portion configured to radiate heat of a space portion in the rear case.

7. A camera module comprising:

an imaging unit including an engaging concave portion in a lens holder holding a lens unit including a flange portion being at right angles to an optical axis;

a first case portion including a flange arrangement portion arranging the flange portion;

a second case portion including a prop portion supporting the flange portion, the prop portion engaging the engaging concave portion, the second case portion being joined to the first case portion;

a fixing mechanism fixing the imaging unit to the first case portion in a direction of an optical axis of the lens unit by putting the flange portion between the flange arrangement portion and the prop portion; and an engaging mechanism making the second case portion to support the imaging unit by engaging the engaging concave portion and the prop portion in a direction that is at right angles to the optical axis.

8. The camera module according to claim 7, wherein the engaging concave portion includes at least first engaging concave portion and second engaging concave portion that have different forms, the prop portion includes at least first prop portion and second prop portion that engage the first engaging concave portion and the second engaging concave portion respectively, and an arrangement direction of the lens unit or imaging sensor unit that is included in the imaging unit is determined by an engagement of the first engaging concave portion and the first prop portion or by an engagement of the second engaging concave portion and the second prop portion.

9. A manufacturing method for a camera module, including:

attaching, to a holder, a lens unit including a flange portion being at right angles to an optical axis of the lens unit and a sensor substrate to form an imaging unit including the lens unit, the holder and the sensor substrate;

adjusting a focus of the lens unit;

supporting, by a prop portion of a rear case, the lens unit of the imaging unit of which a focus is adjusted with the flange portion, and putting the flange portion between the prop portion and a front case to fix the lens unit, and arranging a back end portion of the imaging unit in a buffer region of which a height is set up by the prop portion; and connecting the front case and the rear case.

* * * * *